United States Patent [19]

Scott

[11] Patent Number: 5,340,154

[45] Date of Patent: Aug. 23, 1994

[54] FENDER FLARE FOR A VEHICLE

[75] Inventor: Gary M. Scott, Milwaukie, Oreg.

[73] Assignee: Warn Industries, Inc., Milwaukie, Oreg.

[21] Appl. No.: 871,568

[22] Filed: Apr. 1, 1992

Related U.S. Application Data

[63] Continuation of Ser. No. 660,439, Feb. 22, 1991, abandoned.

[51] Int. Cl.⁵ .............................................. B62D 25/16
[52] U.S. Cl. ..................................... 280/848; 280/154; 280/849; 296/198
[58] Field of Search ............... 280/847, 848, 154, 849, 280/850, 851, 853, 854; 296/198; 52/717, 718

[56]  References Cited

U.S. PATENT DOCUMENTS

| | | | |
|---|---|---|---|
| 3,439,950 | 4/1969 | Kunevicius | 280/847 |
| 4,169,608 | 10/1979 | Logan | 280/848 |
| 4,514,003 | 4/1985 | Guy | 280/850 |
| 4,572,558 | 2/1986 | Chupik | 280/850 |
| 4,784,430 | 11/1988 | Biermacher | 296/198 |

Primary Examiner—Richard M. Camby
Attorney, Agent, or Firm—Robert L. Harrington

[57] ABSTRACT

A fender flare removably secured to a vehicle fender. The flare has an upper edge abutting the fender surface and an intermediate bowed configuration terminating in a flange that underlies an inturned flange of the fender. The flanges are secured together and the upper edge of the flare is fitted with a bonding strip that bonds the full length of the edge to the fender surface. The bonding strip is characterized in having a sufficient thickness to prevent rubbing of the flare edge against the fender, seals the juncture against leaking of contaminants into the cavity defined by the flare, and securely adheres the upper edge of the flare to the fender surface.

5 Claims, 2 Drawing Sheets

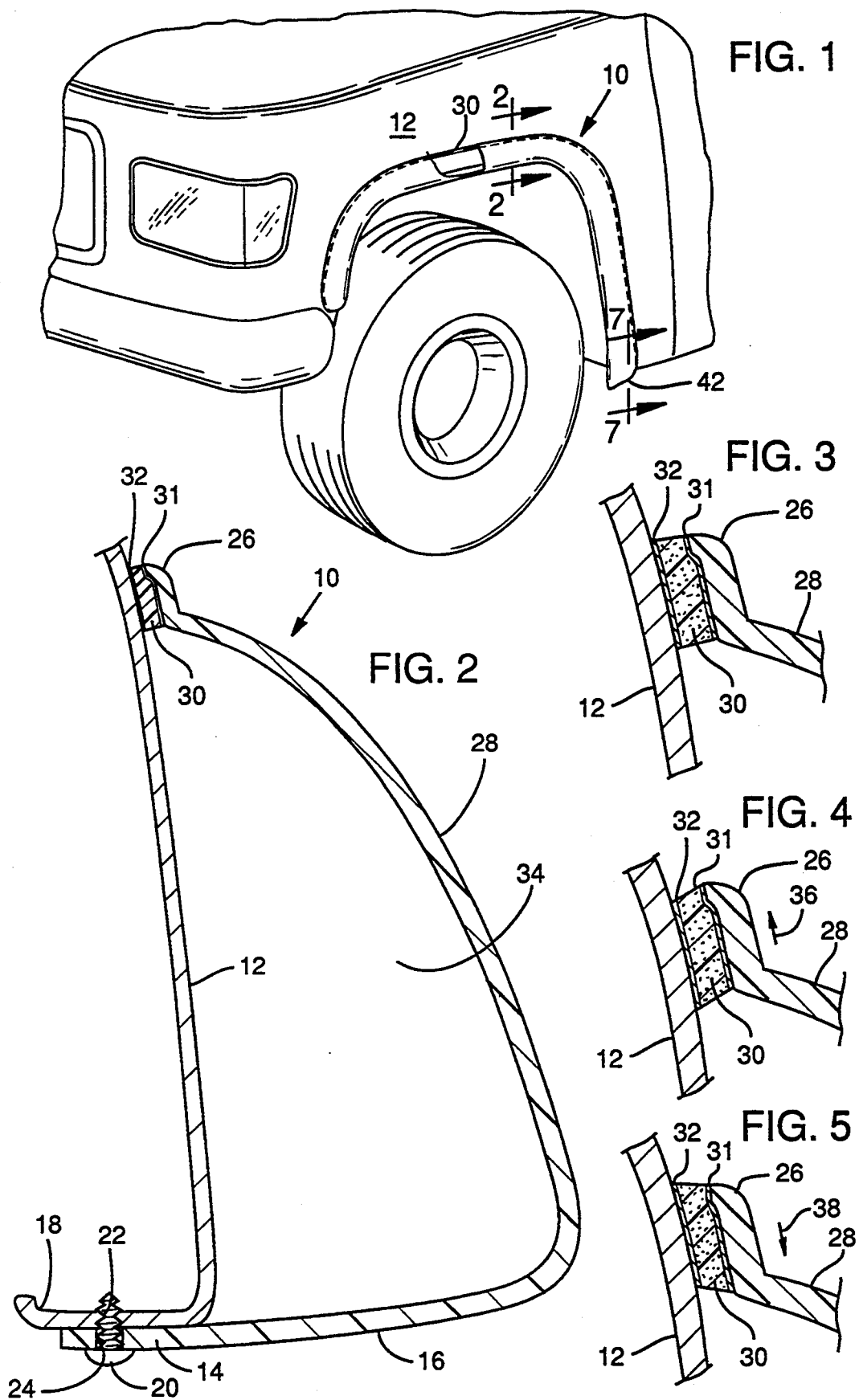

FENDER FLARE FOR A VEHICLE

This is a continuation of co-pending application Ser. No. 660,439 filed on Feb. 22, 1991, now abandoned.

BACKGROUND INFORMATION

1. Field of the Invention

This invention relates to accessories attachable to a vehicle and in particular it relates to a fender flare and method of attaching the flare to a vehicle.

2. Background of the Invention

Manufacturers and users add fender flares to vehicles for aesthetic appeal, functionality and other reasons. An individual desiring a "custom" look will add flares to change the appearance of the vehicle from the "stock look". Flares provide a functional feature to a vehicle when oversize tires having an increased width are mounted on the vehicle. The flares provide an extension to the fender to bring the vehicle with the oversize tires into compliance with licensing requirements in some states. The flares also protect the fender surface from impact by surface material on the roadway, such as gravel, mud or debris that is propelled by the tires of the vehicle.

The flares are most often of one piece construction being molded or formed of a durable material such as plastic. The flares are configured to blend with the contour of the fender surface surrounding the wheel wall. The flares are fitted to the fender of the vehicle with a lower edge of the flare having an extension that fits under the fender edge and is fastened to a turned-in flange of the fender edge surrounding the wheel well. The body portion of the flares are bowed outwardly from the wheel well to extend the fender width and are curved back toward the fender and thereby cover a portion of the fender surrounding the wheel well. An upper edge of the flare is in contact with the fender surface. The molded or formed flares as described are substantially rigid as required to retain the bowed shape, which in turn creates the problem of rubbing or wearing as hereafter described.

In order to secure the upper edge that is in contact with the fender surface, some flares have fasteners installed through the fender. This is undesirable since the flares are removable. With the flare removed, the holes in the fender are exposed and detract from the vehicle's appearance.

A fender extension as disclosed in U.S. Pat. No. 4,169,608 issued to Logan does not use fasteners through the upper edge of the flare in contact with the fender surface. As disclosed by Logan, the flare is made to be resilient and is flexed and maintained in that flexed condition while the lower edge is fastened. This provides a permanent biasing force that urges the upper edge against the fender surface. This arrangement is also not satisfactory. Due to the inherent vibration of the vehicle and the substantial rigidity of the flare material, the upper edge of the flare continuously rubs against the fender surface. The edge is in frictional contact with the fender surface and such rubbing causes a wearing action that will wear through the paint and detract from the vehicle's appearance when the flare is removed.

The rubbing of the upper flare edge directly against the fender surface, i.e., due to vibration or other causes, is undesirable. As the protective paint applied to the fender surface is worn off, the exposed metal of the fender is no longer protected and those exposed areas will be subject to accelerated rusting.

A further problem is created by the cavity between the flare and the fender, i.e., due to the bowed shape of the flare. As the upper edge of the flare is vibrated, grit and moisture will work down between the biased upper edge and the fender surface and become lodged in the cavity. The entry of contaminants into the cavity is detrimental, especially in climate zones where salt and sand mixtures or the like are applied to icy roads. The entry and containment of these mixtures into the cavity promotes corrosion.

It is, therefore, an object of the present invention to provide a fender flare that has its upper edge bonded to the fender surface, in a manner whereby the edge is cushioned against vibration and whereby the bonding provides a seal against entry of contaminants into the cavity.

BRIEF SUMMARY OF THE INVENTION

In the preferred embodiment of the present invention, the flare is designed to precisely fit the configuration of the vehicle's wheel well. The flare is attached at its lower edge to the inturned edge of the fender (as in the prior devices) but with the upper edges forming a net fit to the fender surface and is then adhered to the fender with a sealant that extends the full length of the upper edge that is in contact with the fender surface. The sealant is sufficiently thick to provide a cushion that absorbs the upper edge vibration and prevents the flare from directly rubbing against the fender surface. It seals the flare to the fender to prevent the entry of contaminants into the cavity from the outer edge.

BRIEF DESCRIPTION OF THE DRAWINGS

FIG. 1 is a perspective view of a fender flare of the present invention installed on a fender of a vehicle;

FIG. 2 is a view as viewed on view lines 2—2 of FIG. 1;

FIG. 3 is an enlarged view illustrating the manner of bonding the upper edge of the flare to the fender in accordance with the invention of FIG. 1;

FIGS. 4 and 5 are views similar to FIG. 3 but showing the cushioning action of the adhesive bond of the upper edge of the flare to the fender;

DESCRIPTION OF THE PREFERRED EMBODIMENT

Figure 6:
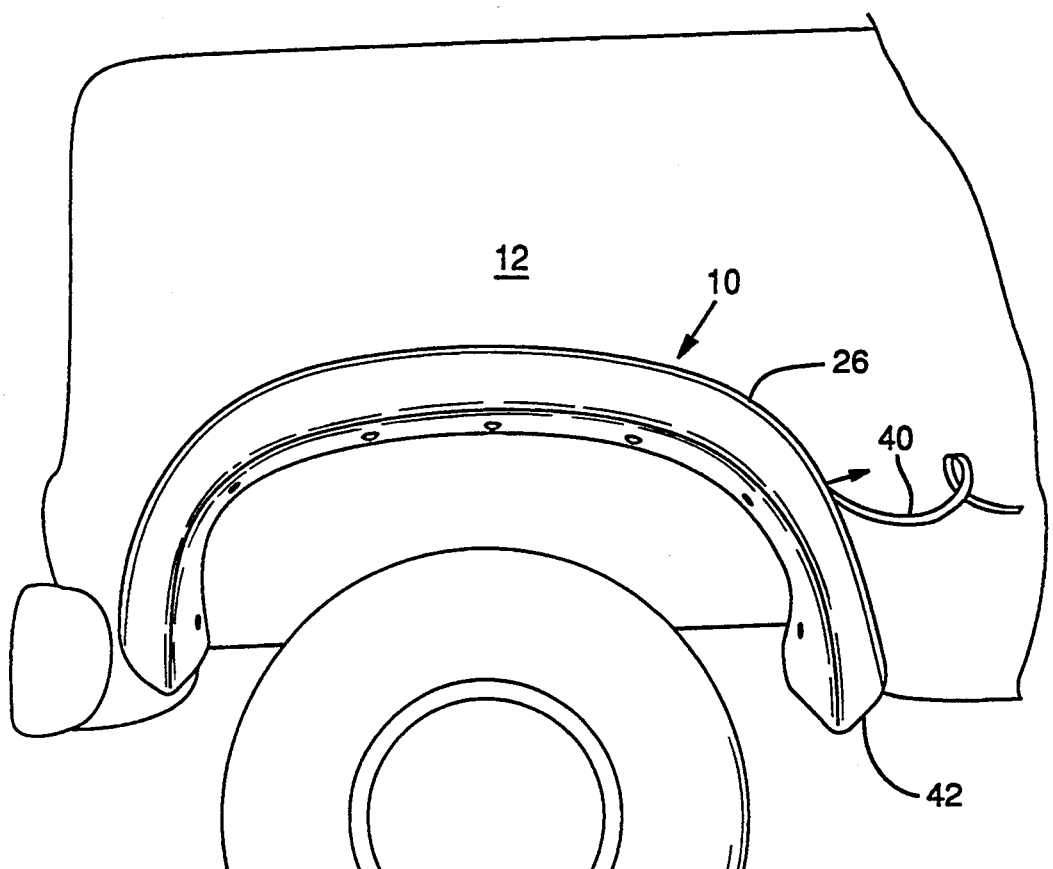
FIG. 6 is a perspective view illustrating the attachment of the upper edge of the flare of the fender.

Refer now to FIG. 1 of the drawings. It illustrates a preferred embodiment of a flare 10 installed on a fender 12 of a vehicle. The flare 10 is preferably a member molded of a durable material such as plastic and having an upper edge adhesively bonded to the fender. The flare 10 is removably installed on the fender 12 having an end portion 14 defining a flange of a leg (extension) 16 secured to a flange 18 of the fender 12 by multiple fasteners 20 and by a flex-joint (cushion) 30 bonding an edge or edge portion 26 of a leg (cover) 28 to the surface of the fender 12 as shown in FIG. 2. The flare 10 is thus removably installed on a fender 12 by fasteners 20 securing the end portion 14 to the flange 18 of the fender.

The fasteners 20 are at spaced intervals along the linear length of the end portion 14 (and the flange 18) to thus secure the end portion 14 to the flange 18 in a conventional manner. The end portion 14 and the flange 18 have aligned holes, end portion 14 having a hole 24 for the free insertion of the fastener 20 and flange 18 having a hole 22 that is threadably engaged by the fastener 20. The attaching of the end portion 14 to the flange 18 locates the upper edge portion 26 in close contact with the surface of the fender 12. As will be noted, the edge portion 26 is configured to provide an up-turned lip that presents a side surface of the flare having a desired width that engages a bonding strip 30. The bonding strip 30 is secured along the linear length of the upper edge 26 and is adhered to the surface of the fender 12 by an adhesive coating 32. The flare 10 is thus fixedly attached to the fender 12 by the fasteners 20 along the lower edge 18 and by the bonding strip 30 along the upper edge 26.

As seen in FIG. 2, the body portion of the flares are sufficiently rigid to extend outwardly from the wheel well to extend the fender width and are curved back toward the fender and thereby cover a portion of the fender surrounding the wheel well. A cavity 34 is formed between the flare 10 and the surface of the fender 12 with the flare 10 installed on the fender 12.

The bending strip 30 fitting between the edge 26 of the flare 10 and the surface of the fender 12 cushions the edge 26 from the surface of the fender 12. This permits relative motion, such as caused by vibration, between the surface of the fender 12 and the edge 26 without any frictional sliding contact between the surface of the fender 12 and the flare edge 26. The strip 30 is bonded to the edge 26 of the leg 28 by an inner adhesive coating 31 and is bonded to the surface of the fender 12 by an outer adhesive coating 32.

The strip 30 fitting between the surface of the fender 12 and the edge 26 of the flare 10 cushions, bonds and seals- The strip 30 fitting between the edge 26 and the surface of the fender 12 prevents the edge 26 from rubbing against the surface of the fender 12. The strip 30 bonds the edge 26 to the fender 12 and it seals the cavity 34 to prevent entry of contaminants FIG. 3 is an enlarged sectional view showing the relation of the strip 30, the surface of the fender 12 and the edge 26 of the flare 10 in the position at time of installation (i.e., with the vehicle at rest).

FIGS. 4 and 5 are a views similar to FIG. 3 showing the result of the edge 26 vibrated relative to the surface of the fender 12 as indicated by arrow 36 in FIG. 4 and arrow 38 in FIG. 5. Note that although the thickness of the strip 30 has been deformed, neither the adhesive bonding of the strip 30 to the edge 26 or to the surface of the fender 12 has been disturbed. The edge 26 has moved without being in frictional contact with the surface of the fender 12 and thus prevents any rubbing or frictional contact.

METHOD OF INSTALLATION

The flare 10 is readily installed on a fender 12 of a vehicle. The flare 10 is preferably a member molded of a durable material such as plastic with dimples (or other reference guides) molded in the edge portion 14 for location of holes 24 and having a bonding strip 30 bonded to the upper edge 26. Providing reference marks, such as dimples, is conventional practice in the molding of products and therefore the dimples have not been detailed.

The strip 30, which is a conventional type trim attachment tape, e.g., produced by the 3-M company, having an adhesive coating 31, 32 on its inner and outer sides. The strip 30 is attached at its inner side by adhesive 31 to the edge 26 after the molding process. The strip 30 is provided with a conventional removable backing tape 40 over the adhesive 32 to prevent contamination of the adhesive (e.g., see FIG. 6). It is preferable to have the strip 30 a little longer in length (i.e., on the order of 3 inches longer) than the length of the edge 26 of the flare 10 as an aid in removing the backing tape as will be explained hereafter.

The vehicle is prepared for the mounting of the flare 10 by removing the wheel well moldings (if any) and cleaning any residue such as wax, oil, dirt and the like off the surface of the fender 12. As a guide to cleaning, the flare 10 may be placed in position on the fender 12 and a few pieces of tape may be placed on the surface of the fender 12 just beyond the edge 26 of the flare 10. Cleaning the surface of the fender assures a good bond between the adhesive 32 of the strip 30 and the surface of the fender 12.

The strip 30 is applied along the edge 26 of the fender flare prior to installation. Adhesive 31 secures the strip to the edge 6. As previously mentioned, the adhesive coating 32 is protected from contamination with a conventional removable backing tape 40.

To prepare the flare for mounting on the fender, holes 24 are drilled in the end portion 14 of the flare 10. As a matter of choice, the holes 24 may be drilled before bonding the strip 30 to the edge 26.

The flare 10 is then positioned on the fender 12 of the vehicle with a close non-pressure fit between the strip 30 bonded to the edge 26 and the surface of the fender 12. Pressure is not required as the strip 30 will securely bond the edge 26 of the flare 10 in position.

With the flare positioned on the fender 12 and utilizing the holes 24 in the flare 10 as a guide, the holes 22 are drilled in the flange 18 of the fender 12.

A fastener 20 is threadably inserted into each hole 22 and is tightened lightly. The fastener 20 is of course fitted through the hole 24 in the end portion 14 and is threadably installed in the hole 22 to secure the end portion 14 to the flange 18.

Starting at the tail end (i.e., the length of the bonding strip 30 extending beyond the edge 26), the backing tape is carefully peeled off the adhesive 32 that will then be in contact with the surface of the fender 12. After the backing tape is completely removed and the upper edge is secured against the fender, the fasteners 20 which Were previously lightly tightened in holes 22 are fully tightened.

The excess length of the strip 30 extending beyond the end of the edge 26 is trimmed off and the edge 26 is firmly pressed toward the surface of the fender 12 to insure a good bond of the adhesive 32 to the surface of the fender 12 and to the edge 26 of the flare 10.

Figure 7:
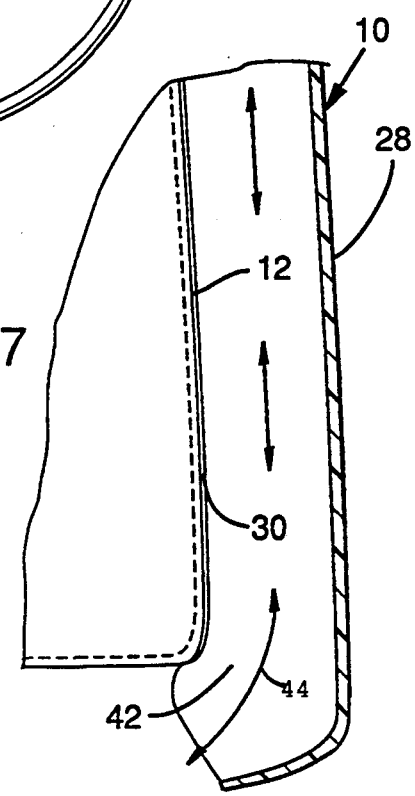
FIG. 7 is a section view as taken on section lines 7—7 of FIG. 1.

The flare of the present invention and the method of mounting same provides for the protection of the fender surface. The strip 30 bonds the edge of the flare in position, it cushions (protects) the fender surface from frictional contact with the flare edge thus preventing wear caused by rubbing and the like, and it provides a seal to prevent entry of contaminants (e.g., grit, moisture salts and the like) into the cavity formed by the installation of the flare on the fender. A further feature is illustrated in FIG. 7, a cross-sectional view of FIG. 1, wherein it will be noted that the flare end 42 extends below the fender. This extension provides an open passageway illustrated by arrow 44 that provides venting of the cavity 34 as in the special circumstances where condensation has formed or other contaminants have entered into the cavity.

As stated, the flare is removably mounted. Should it be required to remove the flare, removal is accomplished by simply removing the fasteners 20 and applying heat to the adhesive 32 by a heat gun, such as a hand held hair dryer. The heat applied will soften the adhesive 32 and the strip 30 may be pulled away from the surface of the fender without damaging either the fender or its protective coating.

The above is supplied by way of example only and is not intended to limit or define the scope of the invention. Others skilled in the art will conceive of numerous variations which are considered encompassed by the invention as defined in the claims appended hereto.

What is claimed is:

1. A vehicle having fenders that overlie wheels mounted on the vehicle and which fenders have side walls and side wall fender surfaces with side openings that define a configured edge through which the wheels are exposed, said configured edge having an inturned flange and leading and trailing ends;

a fender flare of substantially rigid material removably mounted to one of said fenders, said fender flare configured to have an upper edge portion adjacent the fender surface of the side wall above said configured edge thereof and a upper leg extending from said upper edge portion outwardly from the fender surface forming a cavity therebetween, and a lower edge extending back toward the configured edge of said one of said fenders and terminating at an end portion defining a flange that underlies the inturned flange of the fender, and the improvement which comprises;

said upper edge portion of said fender flare having an extreme outer edge defined by the thickness of said flare, said upper edge portion provided with a lip including a side surface that is presented to the fender surface, and said side surface having a length substantially greater than the extreme outer edge;

fastening means for fastening the flange of the fender flare to the flange of the fender, said fastening means being sufficient to accomplish such fastening independent of other fasteners applied thereto, said fender flare further configured to substantially produce a net fit when fastened to the flange of the fender whereby the lip is positioned in face-to-face adjacency with the fender surface, a bonding strip applied continuously along said side surface of said lip provided at said upper edge portion of the flare and bonded to said side surface and interposed between said side surface and the surface of the fender, said bonding strip bonded to said fender surface, said bonding strip additionally having sufficient thickness, resiliency, and sealing properties to prevent frictional rubbing of the flare's upper edge portion on the fender surface, and to seal the juncture between said upper edge portion and the fender surface.

2. A vehicle as defined in claim 1 wherein the improvement further includes an extension of the fender flare that extends beyond the trailing end of the configured edge of the fender, said fender flare extension including a vent opening that vents the cavity of the flare to the atmosphere.

3. A vehicle as defined in claim 1 wherein; said lip is an integral part of said upper leg.

4. A fender flare for attachment to a fender of a vehicle wherein the fender has a side opening that defines a configured edge having an inturned flange, and an exterior side wall surface extended upwardly from said configured edge, said fender flare comprising:

a rigid sheet-like member configured to have an upper edge portion that is to be fitted against the side wall surface of a fender, said member including an upper leg extending from said upper edge portion outwardly from the fender surface to form a cavity therebetween, and a lower leg extending back toward the fender and terminating at a lower edge portion defining a flange that underlies the inturned flange of the fender, and the improvement which comprises;

said upper edge portion of said fender flare having an extreme outer edge defined by the thickness of said sheet-like member, said upper edge portion provided with a lip including a side surface that is presented to the exterior side wall surface of said fender, and said side surface of said lip having a length substantially greater than the extreme outer edge of said upper edge portion;

fasteners for fastening the flange of the fender flare to the flange of the fender, said fasteners being sufficient to accomplish such fastening independent of other fasteners applied thereto, said fender flare further configured when fastened by said fasteners to cause the lip of the fender flare to fit in face-to-face relation with the fender surface, a strip of bonding material applied continuously along said side surface of said lip and bonded to said side surface and interposed between said side surface and the side wall surface of the fender, said strip adapted for producing a bonding of said lip on said upper edge portion to said fender surface, said strip of bonding material additionally having sufficient thickness, resiliency, and sealing properties to prevent frictional rubbing of the flare's upper edge portion on the side wall surface of said fender.

5. A fender flare as defined in claim 4 wherein the strip of bonding material is adhesively secured to the lip and provides an exposed outer face to be bonded to the side wall surface of said fender, a backing tape covering the exposed face of said strip of bonding material, said backing tape permitting the flare to be adjustably fitted to the fender and to be removed after such fitting for adhesively bonding the upper edge portion of the flare to the fender.

* * * * *